Patented Nov. 17, 1936

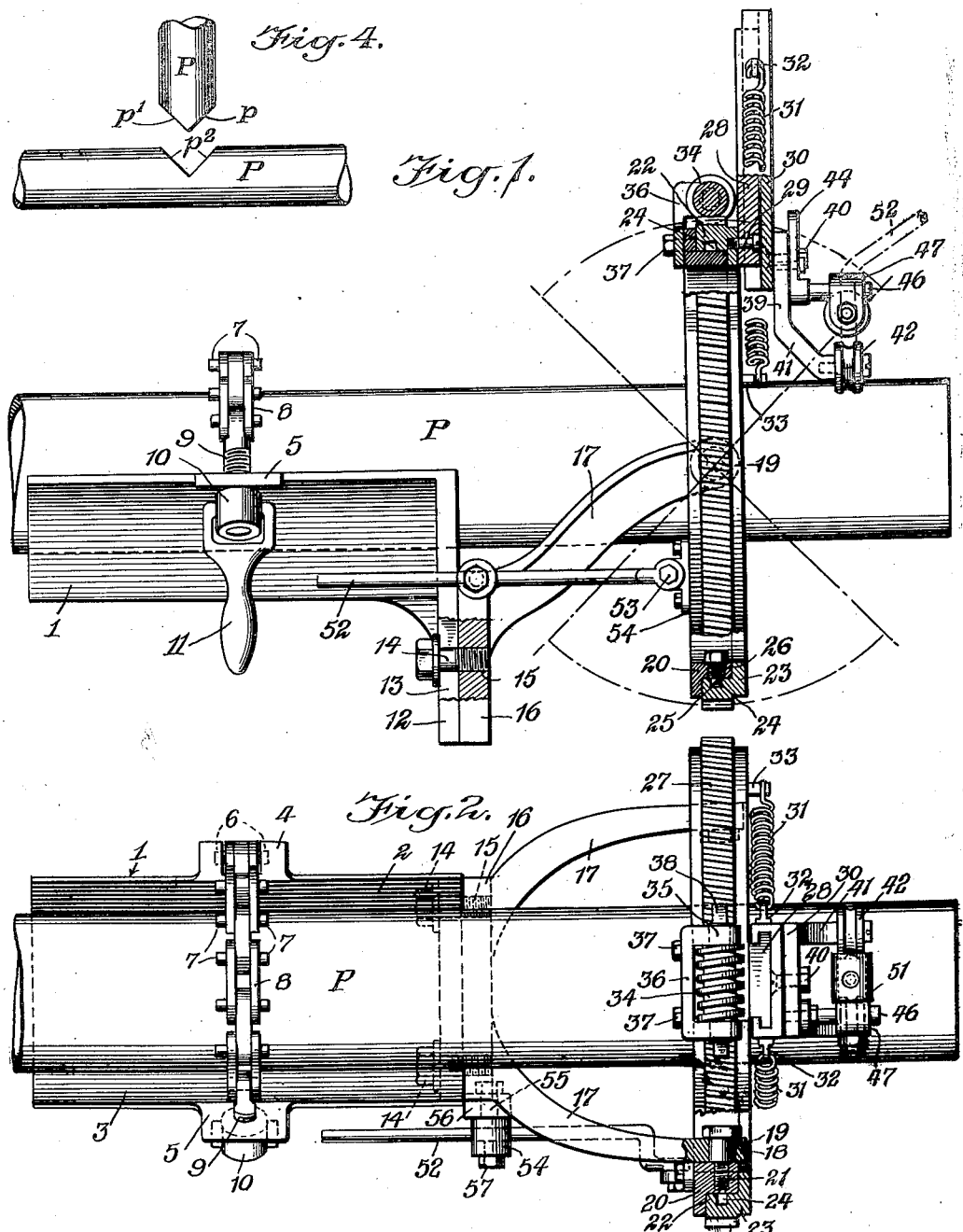

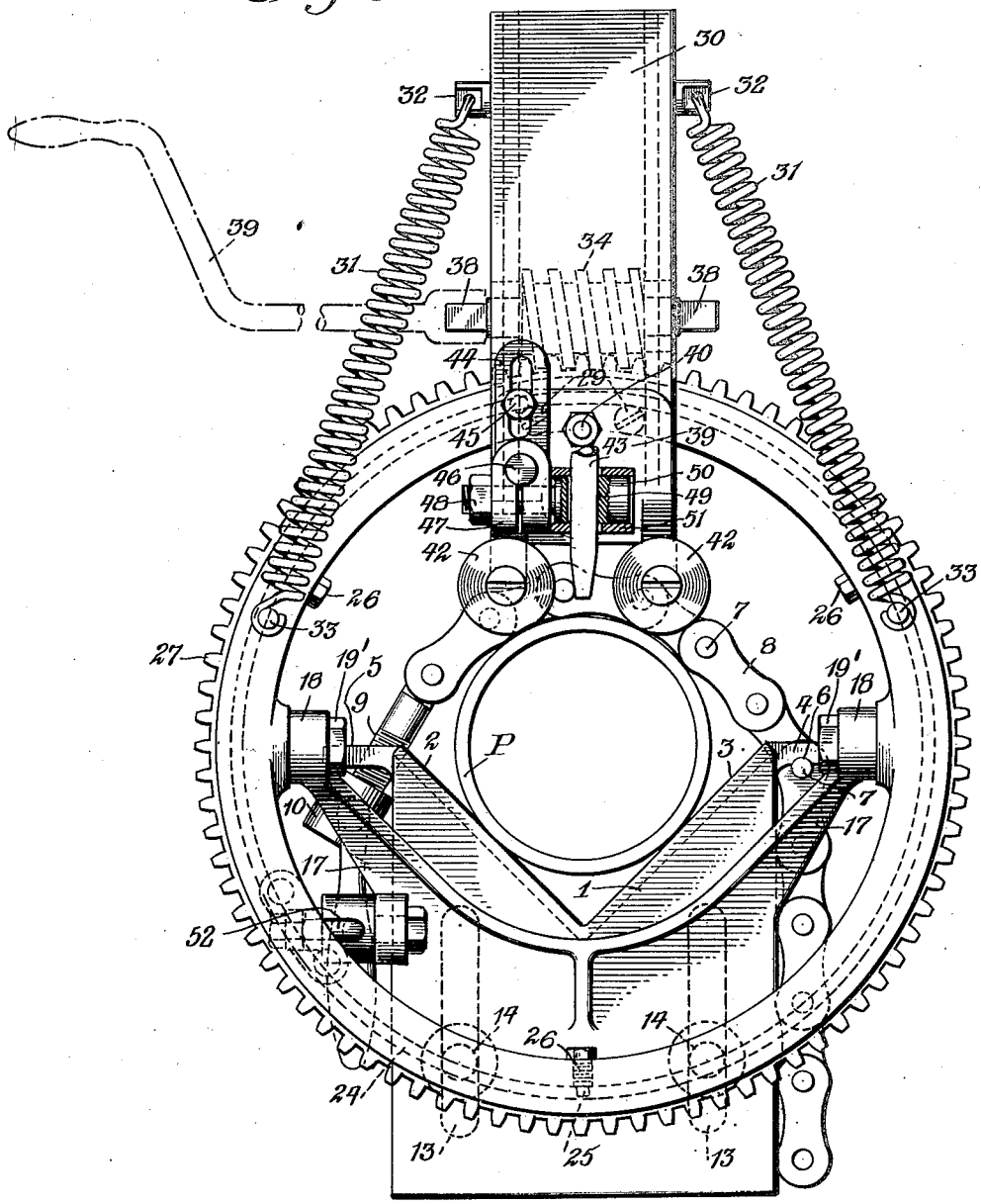

2,061,442

UNITED STATES PATENT OFFICE 2,061,442

PIPE CUTTER

Earl G. Summers, Clendenin, W. Va.

Application June 21, 1935, Serial No. 27,785

5 Claims. (Cl. 266—23)

The present invention relates to pipe cutters, and more particularly to pipe cutters employed in the cutting and fitting of piping used in the transmission of gas or other fluid from its source of supply to the point of delivery.

In the installation of pipe lines for conducting gas from a source of supply to a point of delivery, it is necessary to employ many lengths of pipe, which are united by butt-welding, and in order to secure an accurate fit of the meeting ends, the sections, as they come from the mill, must be cut off accurately before being subjected to the welding process; and as it is required that a line of piping at some points in its length shall vary in the direction in which it runs—as by the use of joints varying in angular disposition—the ends of the pipe sections must be cut on varying angles dependent on the angle of deflection, before welding at such points. Furthermore, at times it is required to connect a branch pipe disposed at substantially a right angle to the main pipe, such branch pipe being united to the main pipe at a point between the ends of a section of the main pipe, and in order that a welded joint can be made at the point of connection, the main pipe must have an angular notch cut therein and the branch pipe must have its end provided with a double bevel so as to accurately fit the notch into which it is welded.

A successful pipe cutter for use in pipe line work must not only be one which will cut off the ends of a pipe section at right angles to its length, but also in order to provide for the production of welded joints at varying angles with relation to the axial line of the pipe, it must be adapted to cut at different angles.

The object of the present invention therefore is to produce a pipe cutter, preferably a portable pipe cutter, simple in form and in which the cutting tool carrier is mounted on a support angularly adjustable with relation to the axial line of the pipe to be cut.

To the above ends the present invention consists of a pipe cutter with means for adjusting the cutter so as to cut the pipe at varying angles with relation to the axial line thereof, and further consists of the devices and combinations of devices which will be hereinafter set forth and claimed.

In the accompanying drawings is shown the preferred form of the invention, in which—

Fig. 1 shows the pipe cutter in side elevation when in operative position to cut off the end of a pipe section on a line at right angles to the longitudinal axis thereof, the cutter carrier and its support and other parts being shown in cross section;

Fig. 2 is a top plan view of the apparatus as shown in Fig. 1, one of the axial supports for the cutter carrier being shown in horizontal section;

Fig. 3 is a front elevation of the apparatus as mounted upon a pipe section to be cut, showing in dotted lines a crank for operating the cutter;

Fig. 4 shows in elevation sections of piping as cut by the apparatus preliminary to welding them together to form a branch in the line extending at right angles to the axial line of the other section.

Similar reference characters will be employed throughout the specification and drawings to designate like parts.

The apparatus comprises a clamping device whereby it may be fixedly connected to a pipe section P to hold the pipe section and the pipe cutter mounted thereon in a fixed position longitudinally of the pipe during the cutting operation. This clamping device comprises a saddle 1 formed of a casting having upwardly diverging side walls 2 and 3 disposed at an angle to each other of substantially 90 degrees (as shown in Fig. 3) with the apex or angular seat below a horizontal line cutting the axis of the pipe and meeting a vertical line also cutting the axis of the pipe (as shown in Fig. 3). The walls 2 and 3 of the saddle 1 are provided with laterally extending projections 4 and 5 formed integrally therewith, the projection 4 being provided with sockets 6 to be engaged by the projecting pintles or studs 7 of a link chain 8, the chain being connected at one end to a threaded bolt 9 fitting a bearing in the projection 5. An adjustable nut 10 engages the threaded bolt 9 whereby the clamping grip of the pipe by the chain 8 may be brought to that degree necessary to hold the pipe and cutter in operative position. For the purpose of turning the nut 10 it is provided with a pivoted lever or crank 11. The clamping means just described can be adjusted to accommodate pipes of varying diameter within the limits permitted by the size of the apparatus, the clamping chain being adjusted in the projection 4 to that extent permitted by the size of the pipe to be operated upon, and the clamping tension of the chain being regulated by the adjustment of the bolt 9 which engages a screw threaded bearing in the nut 10 which is turned by means of the pivoted crank or lever 11.

At one end the saddle 1 is provided with a depending bracket 12 formed integrally therewith, the said bracket 12 being provided with vertically disposed slots 13 (see Fig. 1 and dotted lines in Fig. 3), receiving bolts 14 (see Fig. 1 and dotted lines in Figs. 2 and 3). Said bolts engage threaded bearings 15 in a back plate or bracket 16 which carries the cutting mechanism, said plate 16 for this purpose being provided at opposite sides near its upper edge with the upwardly and forwardly extending arms 17, as clearly shown in the drawings.

The arms 17 at their forward ends are provided with bearings 18 in which are fitted to freely turn therein the headed bolts 19 which form the trunnions which pivotally support a circular frame 20 at diametrically opposite points which when the parts are adjusted to a pipe will be on a line extending diametrically through and cutting the axis of the pipe, all as will be clearly understood from the drawings. Each of the bolts 19 forming the trunnions for the circular frame 20 will be provided with a threaded portion 21 which engages threaded sockets in the inner face of the frame 20. The frame 20 is circular, or ring-like in form, and on its outer periphery is provided with a rabbetted bearing 22 into which is fitted a circular or ring-like carrier 23 for the pipe cutting mechanism, as will be hereinafter described. The carrier 23 on its inner surface is provided with a continuous groove 24 to receive the studs 25 at the inner ends of the threaded bolts 26 (see Figs. 1 and 3 of the drawings), whereby the ring 23 or cutting tool carrier, while being held upon the ring 20, is free to have a circular or annular movement thereon. For the purpose of turning the ring 23 on the ring 20, the ring 23 is provided with gear teeth 27 which as shown extend entirely around its outer periphery and are in the form of a worm gear, the arrangement being such that the ring 23 may be turned about the ring 20 and about the longitudinal axis of the pipe when making a cut, the cutting tool being mounted upon and carried about the pipe to be cut by the ring 23.

The gear ring 23 supports a radially extending plate 28 secured to the outer face thereof by the screws 29, the plate 28 extending radially beyond the gear ring 23 and in a plane parallel to the plane of said gear ring. This plate 28 receives and supports a sliding carrier 30 arranged to have a sliding movement thereon and in a radial direction with relation to the rings 20 and 23. The sliding plate 30 supports the cutting tool and it is engaged by coil springs 31, one on each side, connected to lugs 32 carried by the sliding plate 30 at or near its upper end, the lower end of the springs 31 being connected to studs 33 carried by the ring 23.

The above arrangement is such that when the ring 23 is turned it will carry with it the radially extending plate 28 and the sliding plate 30, the latter being yieldingly forced toward the central axis of the rings 20 and 23 by means of the springs 31.

For the purpose of turning the ring 23 there is provided a worm 34 supported in bearings 35 of a bracket frame 36 which is fixedly mounted on the ring 20 by means of bolts 37, all as clearly shown in the drawings. The worm 34 is provided with the trunnions 38 which may be engaged by a crank (as shown in dotted lines in Fig. 3), or the worm 34 may be turned by any other means, such as an electric or other motor not shown.

To the lower end of the sliding plate 30 is affixed a bracket plate 39 secured thereto by a bolt 40. At its lower end the bracket plate 39 is provided with downwardly and forwardly extending arms 41, each of which carries a grooved wheel 42. The wheels 42 are spaced apart (as shown in Fig. 3) and in the operation of the apparatus they rest upon the pipe to be cut, the grooves therein constituting a gage to determine the point along the pipe at which the cut is to be made. The springs 31 operating on the slide 30 constantly draw the slide 30 toward the pipe and maintain contact therewith as the gear ring is turned about the pipe in making a cut. The burner 43 of any suitable acetylene torch or cutting mechanism, is positioned between the rollers 42 with its lower end in line with the grooves in said rollers and is so supported that it may be adjusted toward and from the pipe surface with its lower end in line with a line cutting the diameter of the pipe and in a plane which will cut the longitudinal axis of the pipe. A slotted plate 44 is held to the plate 39 by means of a bolt 45, for adjustment radially thereon. At its lower end the plate 44 carries a forwardly projecting cylindrical post 46 upon which is mounted, and free to be adjusted thereon, a split clamp 47. The clamp supports a bolt 48, the inner end of which is provided with a socket 49 to receive the burner 43, and the socket 49 is carried by a cylindrical block 50 at the end of the bolt 48 positioned in a sleeve 51, the sleeve 51 being provided with diametrically disposed openings to receive the burner 43. It will thus be seen that by means of the bolt 48 the angular position about the stud 46 as an axis may be adjusted and simultaneously the angular position of the burner 43 with relation to the axis of the bolt 48 may be adjusted and locked in the adjusted position.

As the parts are shown in full lines in the drawings, it is of course understood that the cut to be made will be in a plane at right angles to the longitudinal axis of the pipe, a true and smooth cut to be butt-welded to an adjacent section similarly cut.

It is desirable at times, however, to cut the pipe at varying angles to the longitudinal axis thereof, and for this purpose the ring 20 which supports the cutting mechanism may be rocked about the diametrically opposite trunnions 19, in both directions (as indicated by the broken lines in Fig. 1). In order to hold the ring 20 and the pipe cutting tool in any position to which it may be turned or rocked, a rearwardly extending bar or rod 52 is pivotally connected as at 53, to a bracket 54 attached to the rear face of the ring 20, the rod 52 being long enough to pass through a cylindrical block 54 carried by a bolt 55 having a turning movement in a bearing 56 at the upper end of the bracket plate 16. A set screw 57 locks the rod 52 in the block 54, thus holding the cutting tool in any position to which it may be adjusted with relation to the longitudinal axis of the pipe.

The burner or cutter 43 will receive a flow of combustible fluid from any suitable source of supply, such as the ordinary tank, through a pipe line 52 (as indicated in dotted lines in Fig. 1).

In the drawings the letter P designates the pipe to be cut, and in Fig. 4, two sections of pipe have been cut so that they may be coupled together to form a branch and a main pipe extending at right angles to each other. For this purpose the end of one section is beveled on both sides as indicated by the letters $p$ and $p^1$, the line of cut being at substantially 45 degrees and meeting on a diametrical line extending to the longitudinal axis of the pipe, the other section of the pipe being provided with an opening $p^2$ extending to a point corresponding to the longitudinal axis and angularly disposed to accurately fit the angular cuts of the branch pipe (all as shown in Fig. 4).

While I have shown and described a portable apparatus in which the pipe clamp is arranged to support the pipe cutting apparatus, it will be understood that the pipe cutting mechanism, including the clamp, may be mounted upon a suitable stationary frame or support.

In operation with the apparatus clamped to a section of pipe and with the adjustments shown, the line of cut will be at right angles to the longitudinal axis of the pipe. The rotation of the worm will revolve the ring carrying the worm gear about the pipe to be cut, carrying the cutter either completely around the pipe or partially around the pipe supposing that it is desired to make a cut therein (as shown in Fig. 4). Should it be desired to cut off a section of the pipe at a different angle, the cutter carrier ring and its support may be adjusted angularly and fixed in the desired position. At all times the cutter carrier or slide is forced toward the pipe by the springs 31, the wheels 42 contacting with the pipe in any position to which it may be adjusted. The cutter is adapted to be carried entirely around the pipe. Within certain range limits permitted by the diameter of the supporting ring and the cutter carrying ring, pipes of varying diameters may be cut, the pipe clamp being adjusted so that regardless of the diameter of the pipe the longitudinal axis thereof will be at the center of movement of the cutter carrying ring. Whether cutting at right angles to the axis of the pipe or at an angle thereto, the relative position of the wheels 42 and the nipple or burner and the cut insures an accurate positioning of the line of cut.

While in the foregoing specification and in the drawings I have described and shown the preferred form of my invention, I desire to be understood as including any modification thereof which may be within the scope of my invention as set forth and claimed.

I claim:

1. In a pipe cutter, in combination, a circular support, a circular cutter carrier mounted on said support and arranged to turn thereon to carry the cutting tool about the pipe to be cut, said support and cutter carrier being adjustable about diametrically opposite points on a plane cutting the longitudinal axis of the pipe to be cut, means to hold the support and cutter carrier in adjusted position, means to revolve the cutter carrier about the pipe to be cut, and means to yieldingly move the cutter toward the pipe to be cut, stops to limit the movement of the cutter towards the surface of the pipe and means to adjust the cutter with relation to said stops.

2. In a pipe cutter, in combination, a pipe clamp, adjustable means for engaging and clamping a section of pipe therein, a bracket or yoke connected to the clamping saddle at one end for vertical adjustment, a circular support mounted in said yoke upon diametrically opposed pivots to adjust the carrier angularly with reference to the longitudinal axis of the pipe; a circular carrier mounted to turn about said support, a rod pivotally connected at one end to said support below its pivotal axis, a pivotal block through which said rod passes, and a set screw for locking said rod to hold the support in a fixed position.

3. In a pipe cutter, in combination, a circular carrier, a support therefor about which it is free to move, a slide carried thereby and radially extending therefrom, a cutting tool mounted on said slide, anti-friction wheels supported upon opposite sides of the cutting tool, springs engaging said slide and said carrier to move said slide and anti-friction wheels radially inward toward the pipe to be cut, and means to adjust the cutting tool with relation to said anti-friction wheels.

4. In a pipe cutter, in combination, a pipe clamp, a bracket vertically adjustable thereon upwardly and forwardly extending arms carried by said bracket, a circular frame pivotally supported by said arms, a pipe cutter supported by said circular frame to move about said frame, means to adjust the bracket with relation to the clamp and the axis of the pipe to be cut so as to center the cutter frame and cutter with relation to the longitudinal axis of the pipe, and stops adjacent the cutter positioned to contact with the pipe to be cut to control the cutting operation.

5. In a pipe cutter, in combination, a circular support, a circular carrier mounted thereon for free rotation, a worm gear on the outer periphery of said circular carrier, a worm for rotating said carrier and a cutting tool mounted on said carrier for radial movement thereon, means to yieldingly hold said cutting tool in cutting position and stops to control its contact with the pipe to be cut.

E. G. SUMMERS.